UNITED STATES PATENT OFFICE.

HENRY M. REICHENBACH, OF ROCHESTER, NEW YORK, ASSIGNOR, BY MESNE ASSIGNMENTS, TO THE EASTMAN KODAK COMPANY, OF SAME PLACE.

MANUFACTURE OF PHOTOGRAPHIC FILMS.

SPECIFICATION forming part of Letters Patent No. 479,305, dated July 19, 1892.

Original application filed April 9, 1889, Serial No. 306,375. Divided and this application filed November 18, 1889. Serial No. 330,638. (No specimens.)

*To all whom it may concern:*

Be it known that I, HENRY M. REICHENBACH, of Rochester, in the county of Monroe and State of New York, have invented certain new and useful Improvements in the Manufacture of Photographic Films; and I do hereby declare the following to be a full, clear, and exact description of the same.

This invention relates to improvements upon or pertaining to the manufacture of flexible photographic films; and it consists in the improvements hereinafter fully described and claimed.

Prior to my improvements in the preparation and manufacture of films from a fluid solution of nitro-cellulose and camphor to form the support or backing for a sensitive film for photographic purposes the nitro-cellulose and camphor were dissolved to form a clear fluid solution in a suitable solvent—such as methyl-alcohol—and the solution was spread in an even coating upon a rigid supporting-surface, such as plate-glass. The film thus formed, which I shall term the "film-support," was permitted to dry or harden, after which a layer or film of gelatino-argentic emulsion was applied to the surface of the film-support, and, after having been dried, the two, forming what I shall term a "photographic film," were stripped from the glass and were ready for use in ordinary roll-holders—such as the Eastman-Walker roll-holder—and for negative printing.

In using a solution of nitro-cellulose and camphor in methyl-alcohol on a large scale in the endeavor to produce a large film-support to support and sustain the sensitized film it was found in drying such film-support that its exposed surface was liable to become pitted or covered more or less with small depressions and was otherwise objectionable. In seeking for a remedy I have discovered that if a small quantity of fusel-oil is added to the solution before spreading it upon the glass or other rigid supporting-surfaces the formation of irregularities in the surface of the film-support during the drying process and other objections are almost entirely avoided, and upon further investigation and experiment I have ascertained that the resulting product could be still further improved by the addition of a small quantity of amyl acetate. Up to the present time the best results have been obtained with a solution prepared in about the following proportions: dissolve nine thousand grains of nitro-cellulose and five thousand four hundred grains of camphor in one hundred and twelve ounces of methyl-alcohol, and to the solution thus obtained add twenty-eight ounces of fusel-oil and seven ounces of amyl acetate.

The nitro-cellulose is dissolved in the methyl-alcohol and the gum-camphor added, the solution being made in a closed vessel, which is subjected to gentle heat and agitation to expedite the action of the alcohol. After this solution is made the fusel-oil and amyl acetate are then added thereto.

To remove all unconverted or imperfectly-dissolved substances and to clarify the solution, I prefer to filter it through fine cotton cloth.

Having prepared a fluid solution of nitro-cellulose and camphor in methyl-alcohol and added a proper quantity of fusel-oil, and, when necessary or desired, amyl acetate, the next operation is to spread the solution upon a rigid supporting-surface in a thin layer or film, care being taken to secure contact with such surface and prevent the formation of bubbles between it and the solution, after which the film while still on such surface is dried, thereby forming a flexible photographically-structureless film-support which adheres firmly to the rigid supporting-surface.

If the fluid solution is applied directly to the perfectly-clean surface of a glass plate, then dried while still upon such surface, and then coated with gelatino-argentic emulsion and again dried, the photographic film will when dried be found to adhere so firmly to said rigid supporting-surface that it can be removed only by the application of considerable force, sometimes resulting in the tearing of the photographic film or stretching it unequally, so that it will buckle and be unfitted for use in roll-holders and for negative-making.

To facilitate the subsequent removal or stripping of the completed photographic film, I rub or coat the surface of the glass or other rigid supporting-surface with a very weak solution of mineral wax in benzine or other suitable solvent or a weak solution of beeswax or with any other equivalent agent to produce the same result before spreading the fluid solution upon said rigid supporting-surface. This preliminary coating should be of a character to weaken without preventing the adhesion of the film-support to the glass surface, as it is very desirable that this film-support when dried should adhere throughout its whole under surface to the rigid supporting-surface during the application thereto and drying of the gelatino-argentic-emulsion film and until the photographic film is ready for removal and use.

Heretofore the fluid gelatino-argentic emulsion has been spread upon the surface of the film-support in a thin layer or film; but experience has shown that when this is done it will not adhere at all points, but will be detached or separated in spots, forming blisters in the photographic film. This I have ascertained is due in part at least to the greasy character of the surface of the film-support, to remove which I first wash such surface preferably with clear water, to which has been added two or three per cent. of a binding agent, such as silicate of potash or silicate of soda, then dry the same, and then spread the layer or film of gelatino-argentic emulsion evenly upon the washed surface, whereby it is caused to stick and adhere. The next step is the drying of the film of gelatino-argentic emulsion, after which the photographic film is stripped from the rigid supporting-surface, preferably by detaching one end and applying it to to a winding device.

The depositing and spreading of the fluid solution of nitro-cellulose, as well as the sensitive emulsion, is best accomplished by mechanical devices.

This application is filed as and constitutes a division of my application filed April 9, 1889, Serial No. 306,575, and the subject-matter claimed in said prior application, Patent No. 417,202, of November 21, 1889, relating to the composition of the nitro-cellulose support containing fusel-oil and amyl acetate, is not claimed herein, the present invention being limited to the treatment of the supporting-plate prior to the application of the nitro-cellulose and the treatment of the latter preliminary to the application of the sensitive emulsion.

Having thus described my invention, what I claim as new is—

The hereinbefore-described improvement in the art of forming flexible photographic films, the same consisting in depositing and spreading a fluid solution of nitro-cellulose and camphor upon a supporting-surface in the form of a thin layer or film and drying the same, then washing the face of the dried film-support with a binding solution, such as a solution of silicate of potash, then spreading upon the surface of said film-support a film of fluid gelatino-argentic emulsion and drying the same, and finally stripping the photographic film from its support.

HENRY M. REICHENBACH.

Witnesses:
FRED F. CHURCH,
S. E. TRUE.